US006973500B1

(12) United States Patent
Yamamoto et al.

(10) Patent No.: US 6,973,500 B1
(45) Date of Patent: Dec. 6, 2005

(54) DATA PROCESSING SYSTEM WITH MANAGEMENT FUNCTIONS TO ALLOCATE A GROUP OF RESOURCES TO CLIENTS

(75) Inventors: Minoru Yamamoto, Tokyo (JP); Takashi Kaneda, Tokyo (JP); Yuji Iwasaki, Tokyo (JP); Hiroki Ueda, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 835 days.

(21) Appl. No.: 09/722,524

(22) Filed: Nov. 28, 2000

(30) Foreign Application Priority Data

Feb. 2, 2000 (JP) ............................. 2000-030240

(51) Int. Cl.[7] ............................................. G06F 15/16
(52) U.S. Cl. ...................... 709/229; 709/226; 718/104
(58) Field of Search ............................... 709/229, 226, 709/225; 718/104; 707/8

(56) References Cited

U.S. PATENT DOCUMENTS

| | | | | |
|---|---|---|---|---|
| 4,961,224 A | * | 10/1990 | Yung | 713/201 |
| 5,555,375 A | * | 9/1996 | Sudama et al. | 709/226 |
| 5,682,530 A | * | 10/1997 | Shimamura | 718/104 |
| 5,794,035 A | * | 8/1998 | Golub et al. | 718/104 |
| 5,925,102 A | * | 7/1999 | Eilert et al. | 709/226 |
| 5,991,793 A | * | 11/1999 | Mukaida et al. | 718/104 |
| 6,058,423 A | * | 5/2000 | Factor | 709/226 |
| 6,094,680 A | * | 7/2000 | Hokanson | 709/223 |
| 6,101,508 A | * | 8/2000 | Wolff | 709/223 |
| 6,192,408 B1 | * | 2/2001 | Vahalia et al. | 709/229 |
| 6,230,200 B1 | * | 5/2001 | Forecast et al. | 709/226 |
| 6,301,616 B1 | * | 10/2001 | Pal et al. | 709/226 |
| 6,427,163 B1 | * | 7/2002 | Arendt et al. | 709/201 |
| 6,442,583 B1 | * | 8/2002 | Eilert et al. | 718/104 |
| 6,466,559 B1 | * | 10/2002 | Johansson et al. | 370/335 |
| 6,470,339 B1 | * | 10/2002 | Karp et al. | 707/8 |
| 6,499,031 B1 | * | 12/2002 | Hopmann et al. | 707/8 |
| 6,542,891 B1 | * | 4/2003 | Loen et al. | 707/8 |
| 6,571,286 B2 | * | 5/2003 | Fisher et al. | 709/224 |
| 6,574,654 B1 | * | 6/2003 | Simmons et al. | 718/104 |
| 6,675,229 B1 | * | 1/2004 | Bruno et al. | 719/328 |
| 2002/0013847 A1 | * | 1/2002 | Fisher et al. | 709/226 |

* cited by examiner

*Primary Examiner*—Bradley Edelman
(74) *Attorney, Agent, or Firm*—Staas & Halsey LLP

(57) ABSTRACT

A data processing system which allows a client to request or release multiple computing resources with a single action. A grouping unit defines groups of resources, and those groups are maintained by a group manager. When a request is received from a client demanding a specific group of resources, a detection unit finds such a member resource of the requested group that is currently used by any other client. If the detection unit has found a member resource in use, then a determination unit determines whether the detected member resource is to be modified. A permission unit permits the requesting client to make access to the requested group of resources if the detection unit finds that none of the member resources of the requested group are being used by any other client, or if the determination unit finds that neither the current user nor the requesting client intends to modify the detected member resource in use.

9 Claims, 16 Drawing Sheets

CLIENT MANAGEMENT TABLE

| CLIENT ID | GROUPING RIGHT | ALLOCATABLE GROUP | DEALLOCATABLE GROUP | RESOURCE REGISTRATION RIGHT | RESOURCE DEREGISTRATION RIGHT | RESOURCE DEALLOCATION RIGHT |
|---|---|---|---|---|---|---|
| C001 | YES | G001, G003 | G001, G003 | YES | YES | YES |
| C002 | YES | G001, G002 | G001, G002 | YES | YES | YES |
| C003 | NO | G002 | G002 | NO | NO | NO |

FIG. 5

SESSION MANAGEMENT TABLE

| SESSION ID | CLIENT ID | GROUPING RIGHT | ALLOCATABLE GROUP | DEALLOCATABLE GROUP | RESOURCE REGISTRATION RIGHT | RESOURCE DEREGISTRATION RIGHT | RESOURCE DEALLOCATION RIGHT | ALLOCATED GROUP | R/W MODE |
|---|---|---|---|---|---|---|---|---|---|
| S001 | C002 | YES | G001, G002 | G001, G002 | YES | YES | YES | G001 | R |
| S002 | C001 | YES | G001, G003 | G001, G003 | YES | YES | YES | G003 | W |
| S003 | C003 | NO | G002 | G002 | NO | NO | NO | | |

FIG. 6

GROUP MANAGEMENT TABLE

| GROUP ID | VALID PERIOD | RESOURCE ID | RESOURCE ID | RESOURCE ID | RESOURCE ID | ASSOCIATE GROUP |
|---|---|---|---|---|---|---|
| G001 | JAN 3,2000 2:00 | R001 | R005 | R006 | | G002, G003 |
| G002 | JAN 2,2000 3:00 | R001 | R007 | | | G001 |
| G003 | JAN 2,2000 5:00 | R006 | | | | G001 |

FIG. 8

DATA PROCESSING SYSTEM WITH MANAGEMENT FUNCTIONS TO ALLOCATE A GROUP OF RESOURCES TO CLIENTS

BACKGROUND OF THE INVENTION

1. Field of the Invention

The present invention relates to a data processing system, and more particularly to a data processing system which allocates necessary resources to client applications according their requests.

2. Description of the Related Art

The advancement of network technologies has enabled various computing resources on a network to be managed in a distributed manner. This type of resource management is becoming more and more common in these years. In such a distributed environment, it is not unusual for a plurality of clients to share a common set of resources, such as files and objects, for the purpose of their efficient use. Here, the term "client" refers not only to computer equipment, but to each piece of application software as well.

To make resource sharing possible, it is necessary to implement appropriate resource management functions in the system. In conventional systems, these functions are provided by a resource management program which allocates and deallocates each requested resource individually. A client has to repeatedly issue a resource allocation request as many times as the number of resources needed. This is a troublesome task particularly when the client handles a number of resources.

Furthermore, the shared resource system has to maintain the coherency or consistency in multiple instances of resources. To ensure this, the system allocates resources in an exclusive manner when they are likely to be modified by the requesting clients. Conventional resource management programs are, however, designed to handle one resource at a time, while ensuring its exclusiveness. It is not efficient to repeat such similar processing.

SUMMARY OF THE INVENTION

Taking the above into consideration, an object of the present invention to provide a data processing system which allows a client to request multiple resources in a simplified way, as well as facilitating exclusive allocation of such resources.

To accomplish the above object, according to the present invention, there is provided a data processing system which allocates necessary resources to requesting clients. In this proposed system, a grouping unit defines groups of resources, and the defined groups are maintained by a group manager. When a request is received from a client that demands a specific group of resources, a detection unit finds such a member resource of the requested group that is currently used by another client. If the detection unit has found this kind of member resource in use, then a determination unit determines whether the detected member resource is to be modified. A permission unit permits the requesting client to make access to the requested group of resources if the detection unit finds that none of the member resources are being used by any other client, or if the determination unit finds that neither the current user nor the requesting client intends to modify the detected member resource in use. This configuration of the proposed data processing system simplifies the process through which a client is allocated a plurality of computing resources.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram which shows an example of a client management table;

FIG. 6 is a diagram which shows an example of a session management table;

FIG. 8 is a diagram which shows an example of a group management table;

DESCRIPTION OF THE PREFERRED EMBODIMENTS

Preferred embodiments of the present invention will be described below with reference to the accompanying drawings.

Figure 1:
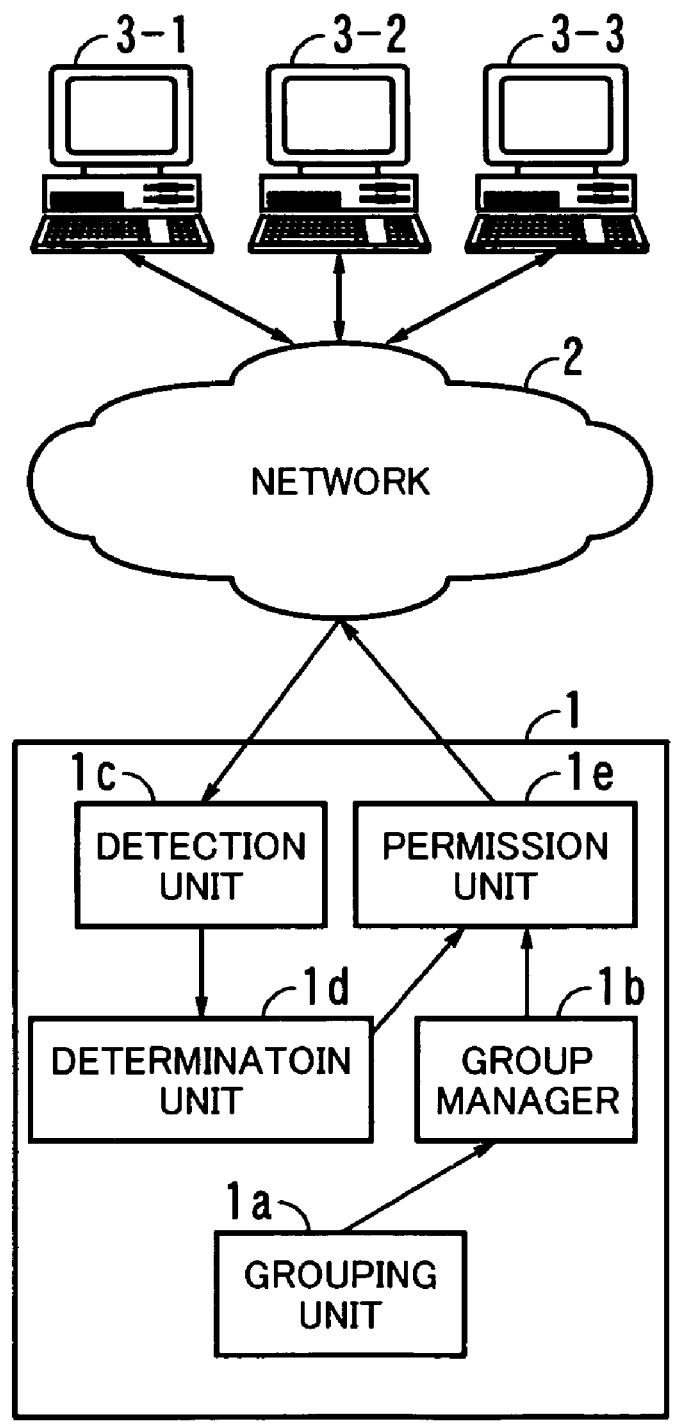
FIG. 1 is a conceptual view of the present invention.

FIG. 1 is a conceptual view of a data processing system according to the present invention. This data processing system 1 comprises a grouping unit 1a, a group manager 1b, a detection unit 1c, a determination unit 1d, and a permission unit 1e. The data processing system 1 communicates with other data processing systems 3-1 to 3—3 through a network 2.

The grouping unit 1a defines a group of resources which are located in the data processing system 1 itself, as well as those in the other data processing systems 3-1 to 3—3. The membership of each group should not be limited to a plurality of resources; the term "group" also refers to a single element group. The group manager 1b manages such groups produced by the grouping unit 1a.

The data processing system 1 receives from its client an allocation request for a specific group of resources. When such a request is received, the detection unit 1c examines the status of each member of the requested group in order to detect such a member resource that is currently used by another client. Note that the term "client" refers to each piece of application software running on the data processing system 1 itself or any other data processing system 3-1 to 3—3. If the detection unit 1*c* finds that any member resource of the requested group is currently used by some other client(s), the determination unit 1*d* then determines whether the current user intends to modify that member resource in use.

The permission unit 1*e* permits the requesting client to make access to the requested group of resources in the following two cases: (a) if the detection unit 1*c* finds that none of the member resources of the requested group are being used by any other client, and (b) if the determination unit 1*d* finds that neither the current user nor the requesting client intends to modify that member resource of interest.

The network 2 is a local area network (LAN) or wide area network (WAN), which connects the data processing system 1 with the others 3-1 to 3—3. The data processing systems 3-1 to 3—3 are based on personal computers or other similar platforms, which need some LL computing resources to accomplish their tasks. They request the data processing system 1 to supply them with such resources as needed, and if the request is granted, they execute various tasks using the allocated resources. The operation of the above system will be explained more specifically in the next section.

Receiving a request from a client or other sources, the grouping unit 1*a* defines groups of resources which are located in the data processing system 1 itself or other data processing systems 3-1 to 3—3. The resultant group definitions are supplied to the group manager 1*b*. Suppose, for example, that a grouping request for specific resources A, B, and C (not shown) has arisen. In response to this request, the grouping unit 1*a* creates a new group G1 (not shown) and informs the group manager 1*b* of the created group. The group manager 1*b* registers the information into its database as a new group entry. It is assumed here that the database already has a record of group G2 (not shown) which has previously been defined as a collection of resources A, D, and E (not shown).

Now consider that, in the situation described above, the data processing system 3-1 raises an access request for the newly registered group G1. This request message is delivered to the data processing system 1 over the network 2 and accepted by its detection unit 1*c*. The detection unit 1*c* parses the message, recognizing that it is an access request for the group G1. The detection unit 1*c* then examines whether any member resource of the group G1 is being used in another client process. Suppose, in the present example, that the group G2 has been allocated to the data processing system 3-2. It should be noticed here that the resource A in the group G1 is common to the group G2. This means that one of the requested resources is currently used by the data processing system 3-2 as a member resource of the group G2. Accordingly, the detection unit 1*c* so notifies the determination unit 1*d*.

The determination unit 1*d* determines whether the current user of the resource A (i.e., the ongoing application process executed on the data processing system 3-2) intends to modify it. Here, the term "modify" means any kinds of data operations (e.g., overwriting, updating, deleting, or whatever) which may result in an alteration of the content, in whole or in part. The result of the above test is passed to the permission unit 1*e*. In the present example, it is assumed that the permission unit 1*e* is notified that the data processing system 3-2 intends no modification to the resource A.

The permission unit 1*e* permits the requesting client to use the group if either of the following conditions is met: (a) none of the member resources of the requested group is being used by any other client, and (b) when some client is using any member resource, neither the current user nor the requesting client intends to modify that member resource. In the present example, the detection unit 1*c* has identified that the resource A is used by some other client, but the determination unit 1*d* has found that the resource A is not to be modified by that client. The permission unit 1*e* then determines whether the requesting data processing system 3-1 has an intention to modify the resource A either. If no modification is expected, the permission unit 1*e* sends a grant message to the requesting system 3-1, which enables it to use the group G1, including resources A, B, and C.

As described above, the proposed data processing system 1 allows a client to specify a group of resources collectively (as opposed to specifying individual resources one by one) when it wishes to have them allocated. In this way, the present invention simplifies the process of resource allocation.

Figure 2:
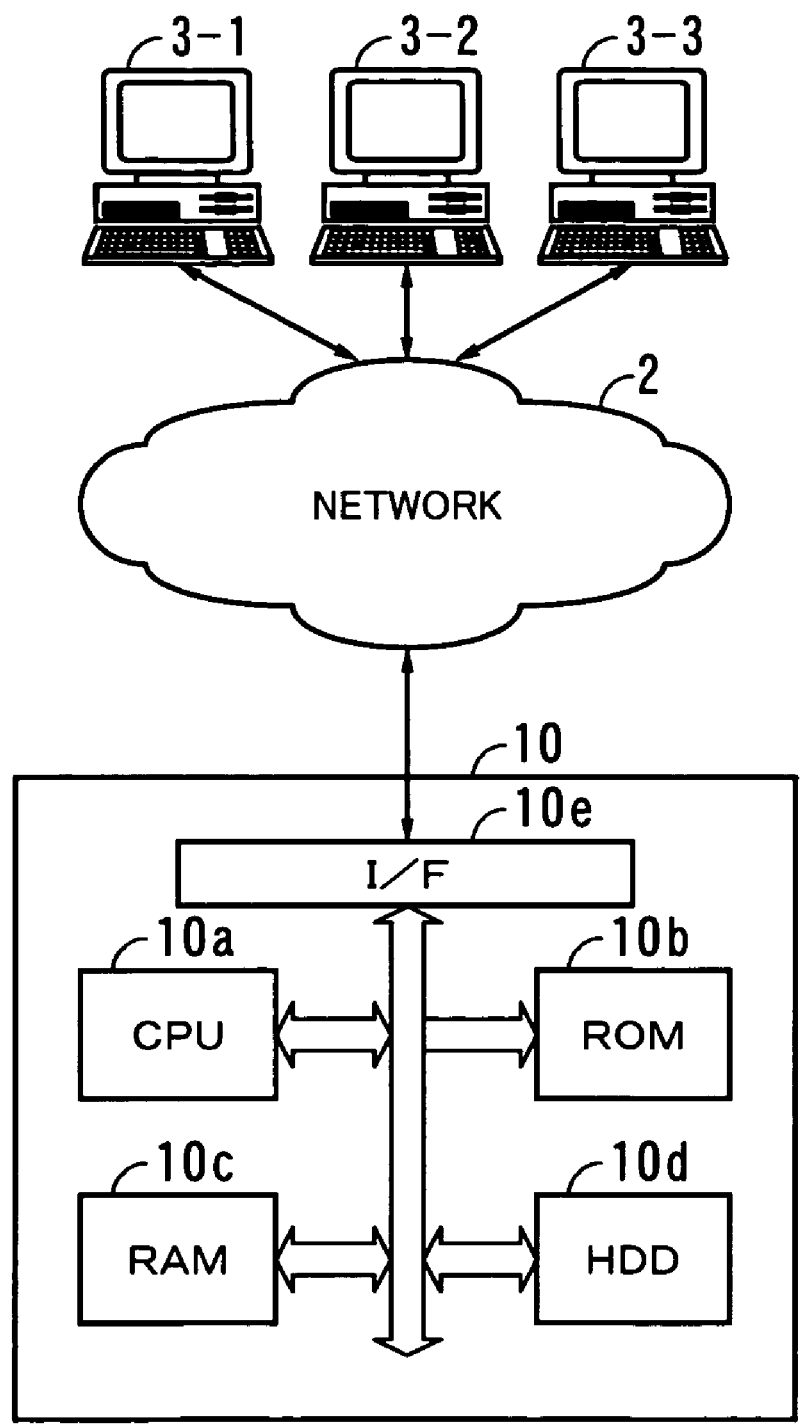
FIG. 2 is a block diagram of an embodiment of the present invention.

Referring next to FIG. 2, a specific embodiment of the present invention will now be described below. As seen from FIG. 2, the proposed data processing system 10 comprises the following components: a central processing unit (CPU) 10*a*, a read only memory (ROM) 10*b*, a random access memory (RAM) 10*c*, a hard disk drive (HDD) 10*d*, and a network interface (I/F) 10*e*. This data processing system 10 communicates with other data processing systems 3-1 to 3—3 through a network 2.

The CPU 10*a* provides various services according to the programs and data stored in the HDD 10*d*, besides controlling other parts of the system. The ROM 10*b* stores basic programs and data that the CPU 10*a* executes and manipulates. The RAM 10*c* serves as temporary storage for application programs and scratchpad data that the CPU 10*a* executes and manipulates at runtime. The HDD 10*d* stores programs and data that the CPU 10*a* executes and manipulates. The network interface 10*e* provides protocol conversion services to enable the CPU 10*a* to send and receive data to/from the data processing systems 3-1 to 3—3. The network 2 is a LAN or WAN, serving as a communications medium connecting the data processing systems 10 with other data processing systems (or clients) 3-1 to 3—3. The data processing systems 3-1 to 3—3 are equipment based on personal computers or other similar platforms, which may request necessary computing resources to the data processing system 10. If the request is granted, they execute various tasks using those allocated resources.

Figure 3:
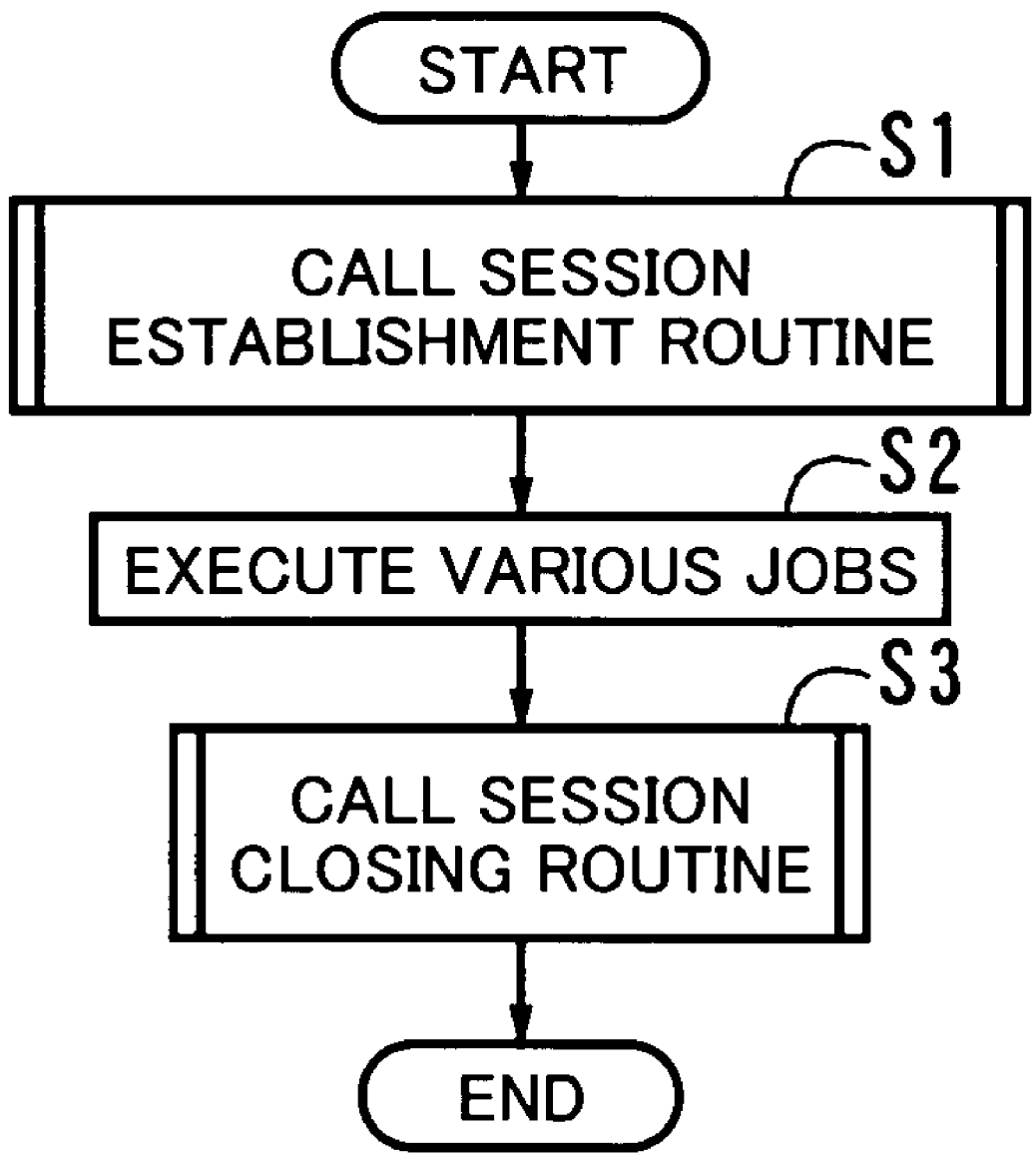
FIG. 3 explains a typical job processing flow which is executed by a client on a session that has been established with the proposed data processing system.

According to the present invention, the proposed data processing system 10 operates as follows. Generally in the present embodiment, the requesting client sets up a session with the data processing system 10 before requesting it to provide specific services. The data processing system 10 executes requested jobs within the session that has been established. This general process flow is shown in the flowchart of FIG. 3.

(S1) The CPU 10*a* calls a routine that initiates a session with the requesting client. The details of this session establishment routine will be described later with reference to FIG. 4.

(S2) The CPU 10*a* executes various jobs as requested by the client. More specifically, the jobs include a resource grouping process and group allocation process shown in FIG. 9 and other drawing that follow.

(S3) The CPU 10*a* calls a routine that closes the session. The details of this session closing routine will be described later with reference to FIG. 5.

Figure 4:
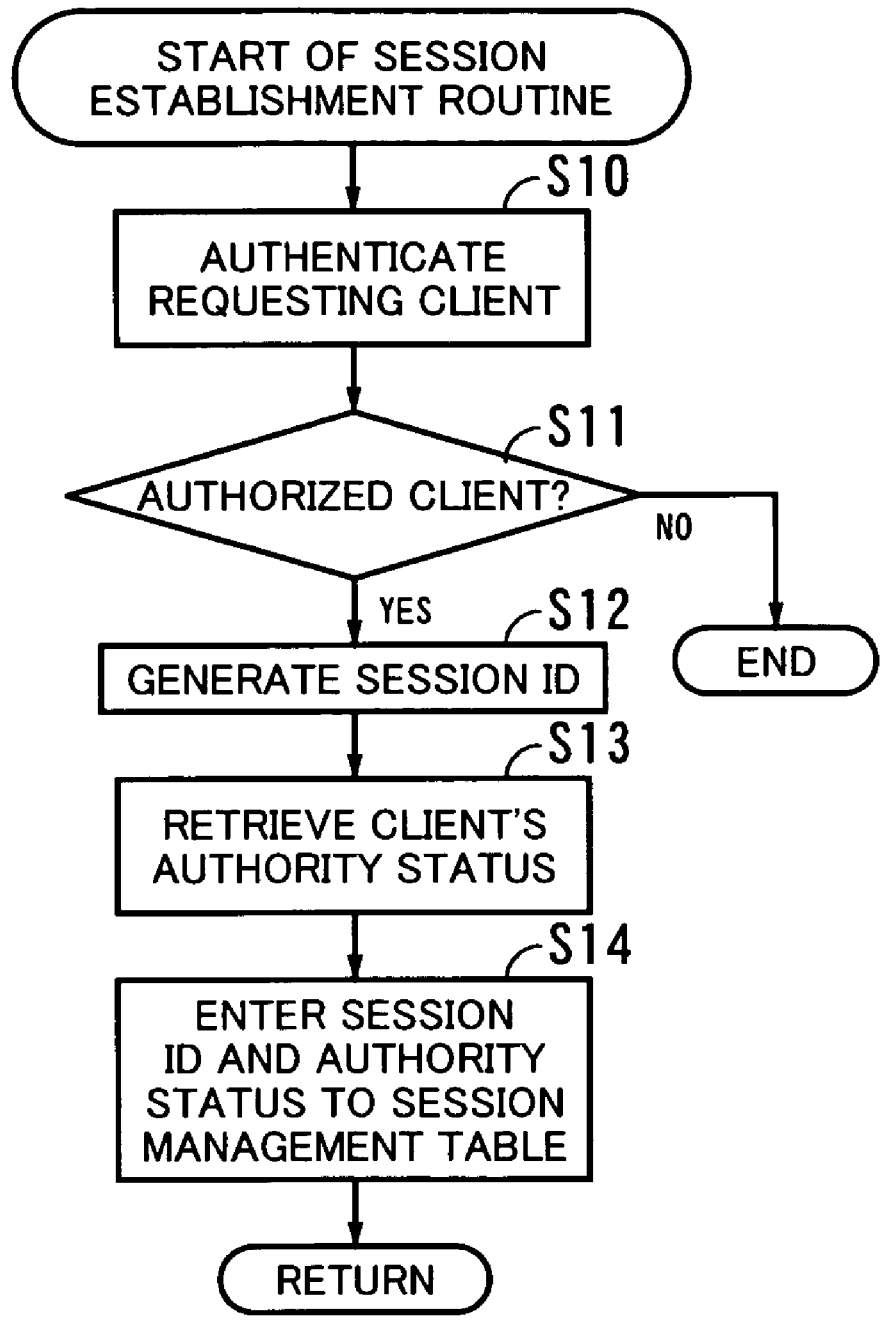
FIG. 4 is a flowchart which explains the details of "session establishment routine" shown in FIG. 3.

Referring now to FIG. 4, the details of the session establishment routine called at step S1 is shown. This routine comprises the following steps.

(S10) The CPU 10a authenticates the requesting client, checking its login password that has been sent to the data processing system 10 beforehand.

(S11) If the client is successfully verified as an authorized entity at step S10, then the CPU 10a goes to step S12. If not, it terminates the process.

(S12) The CPU 10a generates a session ID for the session to be established. Every ongoing session has its session ID to uniquely distinguish itself from others.

(S13) The CPU 10a makes access to the HDD 10d to retrieve information about the client's authorization status, i.e., what kinds of rights are given to the requesting client. The HDD 10d stores a table for this purpose, which is called the "client management table."

FIG. 5 shows an example of the client management table, each entry of which provides the following data fields:
Client ID
Grouping right
Allocatable group
Deallocatable group
Resource registration right
Resource deletion right
Resource deallocation right The "Client ID" field shows a unique identifier assigned to each client. The "Grouping right" field of a specific client's table entry indicates whether the client has the right to define a group of resources. The "Allocatable group" field contains a list of group IDs, indicating which groups can be allocated to the client of interest. See the topmost entry of the table, for example. This table entry shows that the client "C001" can request the groups "G001" and "G003." In other words, the client has a group allocation right for those two groups. The "Deallocatable group" field contains a similar list of group IDs, indicating which groups can be deallocated from the client. Normally, this list matches with that in the "Allocatable group" field. The "Resource registration right" field indicates whether the client has the right to enroll a new resource to the system. The "Resource deregistration right" field indicates whether the client has the right to deregister a resource from the system. The "Resource deallocation right" field indicates whether the client has the right to deallocate a resource from the client itself.

(S14) The HDD 10d stores another table to manage the client sessions, which is called the "session management table." With the session ID and the client's authorization status obtained at the preceding two steps, the CPU 10a now creates a new entry of this table.

FIG. 6 shows an example of the session management table, each entry of which provides the following data fields:
Session ID
Client ID
Grouping right
Allocatable group
Deallocatable group
Resource registration right
Resource deletion right
Resource deallocation right
Allocated group
R/W mode The "Session ID" field stores what the CPU 10a has generated at step S12 of FIG. 4. The "Client ID" field gives the identifier of the client requesting session establishment. The "Grouping right" field and other five fields that follow are used to store the client's authorization status which has been obtained at step S13 of FIG. 4. The "Allocated group" field shows which group is being allocated to the session. The "R/W mode" field indicates whether the resources in the allocated group is designated as "read only" (R) or "writable" (W). Take the first two entries of the illustrated session management table, for example. These entries indicate that the client can read, but not write to the group G001 in the session "S001" while the other session "S002" allows both types of access to the group G003.

Figure 7:
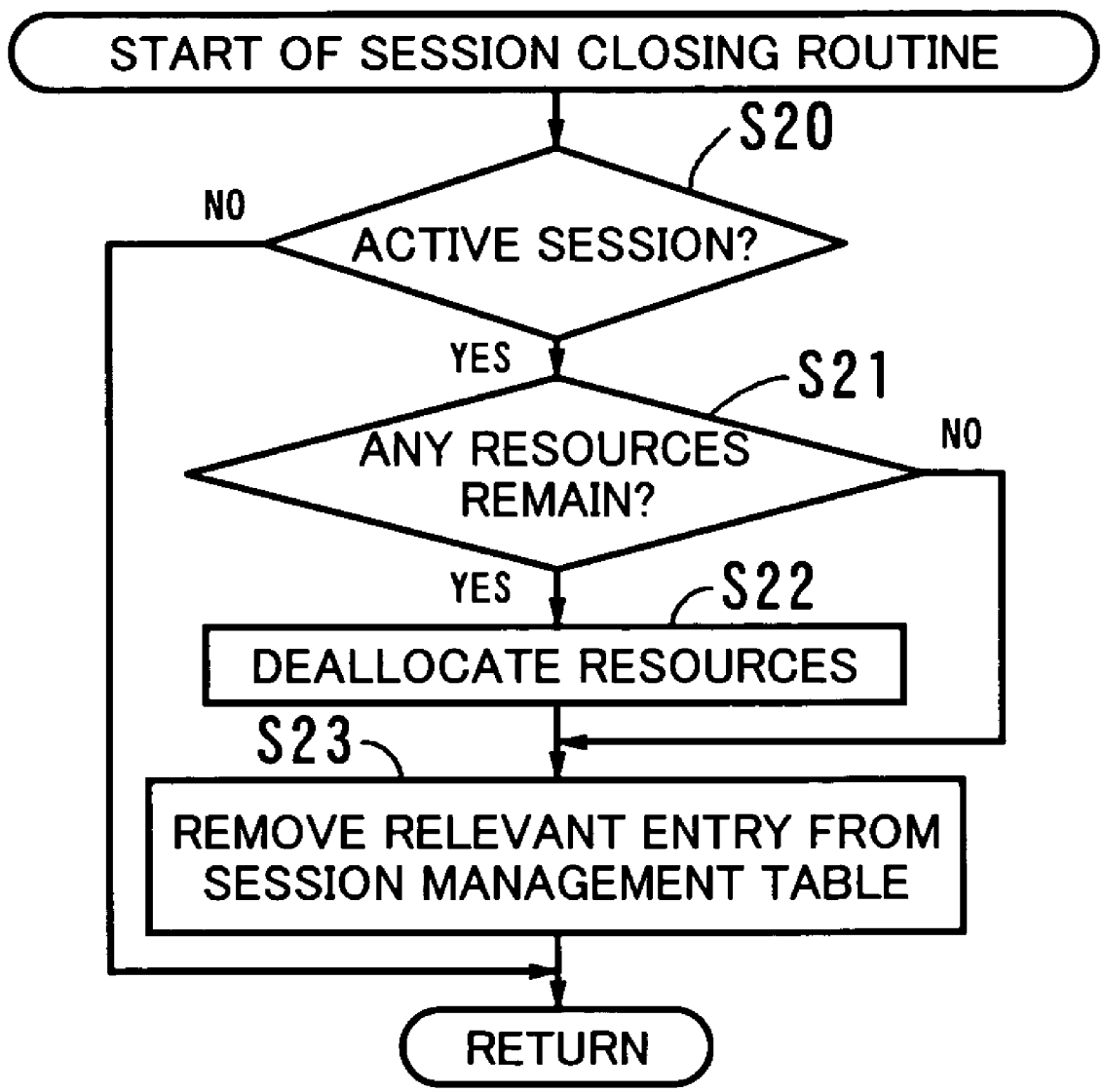
FIG. 7 is a flowchart which explains the details of "session closing routine" shown in FIG. 3.

The session is established through the above processing steps S10 to S14, which now permits the client to receive various services from the data processing system 10 as will be described later. Before presenting the detail of each service to be provided, the next session will explain how the session is closed. Referring to FIG. 7, the session closing routine provides the following processing steps when it is called:

(S20) The CPU 10a determines whether the specified session is valid and active. If so, the process advances to step S21. If not, the process is terminated.

(S21) The CPU 10a then examines whether any resources still remain allocated (i.e., the client has not yet released them). If such a resource is found, the process advances to step S22. If no such resources remain, the process skips to step S23.

(S22) The CPU 10a deallocates the remaining resource (s).

(S23) The CPU 10a removes a relevant entry from the session management table.

The next section will now describe how the proposed data processing system 10 formulates and allocates a group in response to a client's request. It is assumed that the data processing system 3-1 has set up a session "S001" with the data processing system 10 and is now requesting the allocation of three resources. These resources are identified by their unique identifiers (resource IDs) "R001, "R005," and "R006".

In the above context, the CPU 10a in the data processing system 10 consults its local session management table (FIG. 6) to determine whether the requesting client is eligible to organize a group of resources. Since the table entry for the session ID "S001" tells that the client is given a grouping right, the CPU 10a then executes a program to create a group, which is referred to herein as the "resource grouping process." Through this process, the CPU 10a creates a resource group containing three individual resources "R001, "R005," and "R006" and registers it as a new entry of a table shown in FIG. 8. This table, called the "group management table," stores the information about the resource groups that have been created so far. Each entry of the table has the following data fields:
Group ID
Valid period
Resource ID
Associate group The "Group ID" field contains a unique identifier assigned to each group. The "Valid Period" field of a specific group's table entry shows the term of validity of that group. The CPU 10a automatically removes an entry if its valid period expires, to prevent obsolete group definitions from remaining in the HDD 10d. The "Resource ID" fields contain the identifier of every member resource constituting the group of interest. The "Associate group" field contains a list of group IDs, showing whether the group shares its resource with any other groups. In other words, this field shows the cross-relationships among groups. Take the group "G002," for example. Since its member "R001" is common to the group "G001," the table entry for the group "G002" holds the group ID of that group in its associate group field.

The CPU 10a generates an appropriate group ID "G001" and gives it to the group management table, besides entering resource IDs "R001," "R005," and "R006" to the resource ID field. The CPU 10a also give an appropriate valid period to the group, depending on the importance of member resources. It further identifies the associate groups from among the existing groups and updates the table with their cross-reference relationships. In this way, the group "G001" is defined as a new entry of the group management table of FIG. 8.

The created group will be allocated to a specific client as follows. Suppose that the data processing system 3-1 with a client ID "C002" is requesting resources belonging to the group "G001" in the course of a session "S001". In response to this request, the CPU 10a in the data processing system 10 consults the session management table of FIG. 6 to determine whether the requesting client has a group allocation right. The first entry of this table is relevant to the ongoing session "S001, " and its allocated group field indicates that the client is eligible to use a group G001 or G002. Accordingly, the CPU 10a executes a group allocation process as will be described below.

First, the CPU 10a determines whether any associate group (i.e., a group having a close relationship with the requested group) is being used in the writable (W) mode. If so, there is a chance that the user of the associate group could modify a member resource of the requested group. For this reason, the CPU 10a basically turns down the request from the client. Another option is to suspend the request temporarily and resume the processing after the associate group is finished using.

If there is no associate group being used in the writable mode, then the CPU 10a determines whether the requesting client intends to use the group in the writable mode. If so, the CPU 10a further checks whether any other group related to the requested group is in use. If there is such an associate group, it turns down or suspends the client's request. If not, the CPU 10a initiates a resource allocation process for the requesting client. More specifically, it allocates all the requested resources to the client, according to the relevant group definition found in the group management table of FIG. 8. When this operation is finished, the CPU 10a then updates the session management table of FIG. 6 with the identifier of the allocated group and its R/W status. In the present example, the group ID "G001" and "Read only" (R) mode is set to their respective data fields of the first table entry, which represents the current state of the session "S001."

Now that all the necessary resources have been obtained, the data processing system 3-1 can execute its intended operations, reading and writing the resources according to its discretion. When the allocated resources become no longer necessary, the client (data processing system 3-1) notifies the data processing system 10 that it is ready to release the allocated group. In response to this notification, the CPU 10a in the data processing system 10 consults the session management table of FIG. 6 to determine whether the requesting client has a group deallocation right. The CPU 10a initiates a group deallocation process in the present example, since the table entry for the current session "S001" tells that the client "C002" can deallocate the groups "G001" and G002."

In the resource deallocation process, the CPU 10a sequentially deallocates the resources that are listed in a relevant group definition found in the group management table of FIG. 8. When this step is finished, the CPU 10a then updates the session management table of FIG. 6, nullifying the relevant "Allocated group" and "R/W" fields. The deallocation of a resource makes it possible for other clients to use such groups that include the released resource.

According to the above-described embodiment of the present invention, computing resources are divided into groups to allow each client to be allocated a group of resources with a single action. This mechanism makes it easy for the clients to request necessary resources. The proposed system also implements the exclusive use of resources on a group basis, eliminating the need for monitoring individual resources. The proposed system, however, can support exclusive allocation of each individual resource, as opposed to the group-based control.

The above-described processing functions are implemented in software programs as will be explained with reference to FIGS. 9 to 12.

Figure 9:
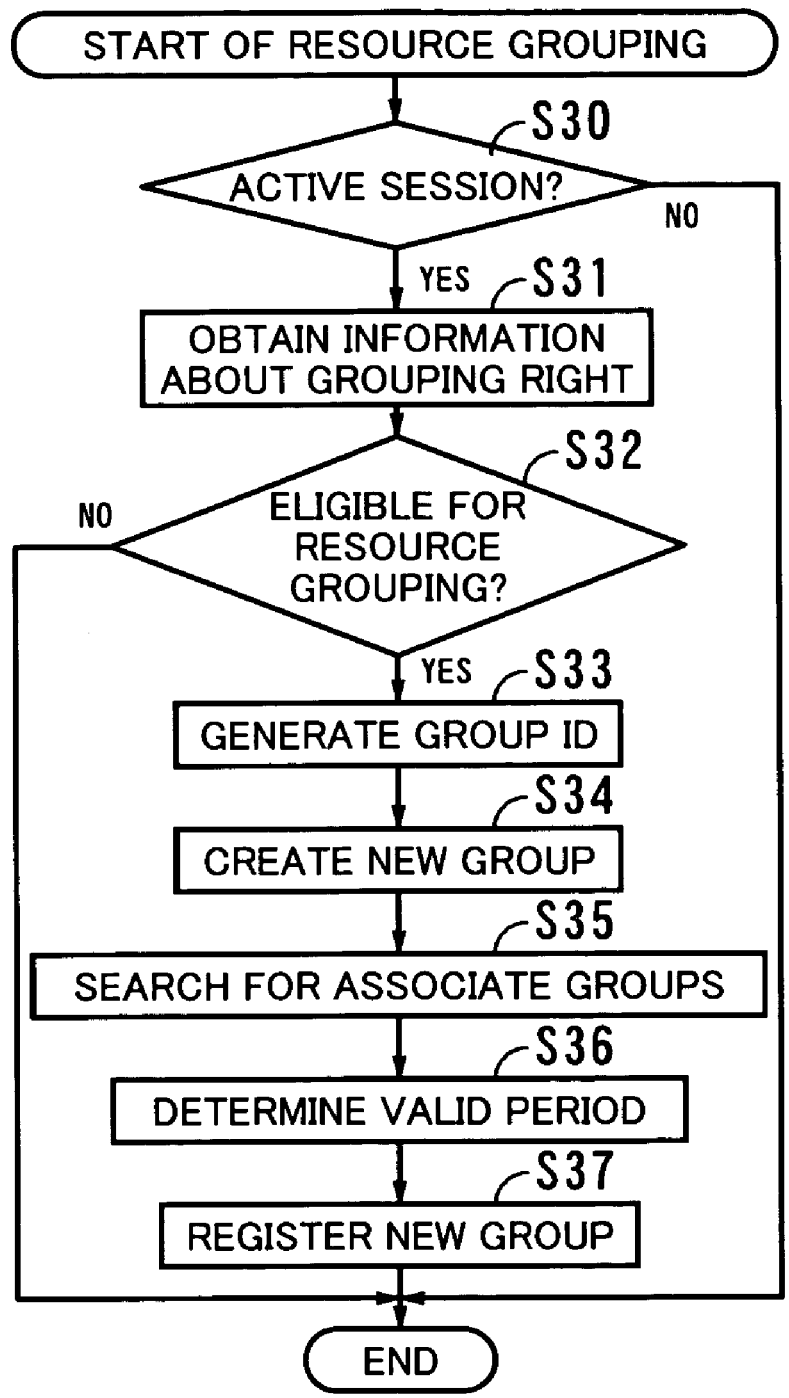
FIG. 9 is a flowchart which explains an example of a resource grouping process.

Referring first to the flowchart of FIG. 9, the resource grouping process will be described. This process is initiated when, for example, the user wishes to manually define a group of resources, or when a grouping request is received from an application program. More specifically, the resource grouping process comprises the following steps.

(S30) The CPU 10a scans the session management table of FIG. 6 to see whether it contains the session ID specified in the client's request. If the session ID is found, the specified session is considered to be valid and active, allowing the process to advance to step S31. If not, the CPU 10a aborts the current process, rejecting the client's request.

(S31) From the session management table of FIG. 6, the CPU 10a retrieves information about the grouping right that the requesting client has.

(S32) If the information retrieved at step S31 suggests that the client is authorized to define a group, the process advances to step S33. If not, the CPU 10a aborts the process, rejecting the client's request.

(S33) The CPU 10a generates a group ID. This ID will be assigned to a new group to be created.

(S34) The CPU 10a creates a new group.

(S35) The CPU 10a searches the group management table for any existing groups that share some resources common to the new group. These groups are referred to as the "associate groups."

(S36) The CPU 10a determines the valid period of the newly created group by evaluating, for example, how important each member resource is.

(S37) The CPU 10a registers the created group as a new entry of the group management table of FIG. 8.

The above processing steps allow an eligible client to create a new group of resources and register it to the group management table of FIG. 8.

Figure 10:
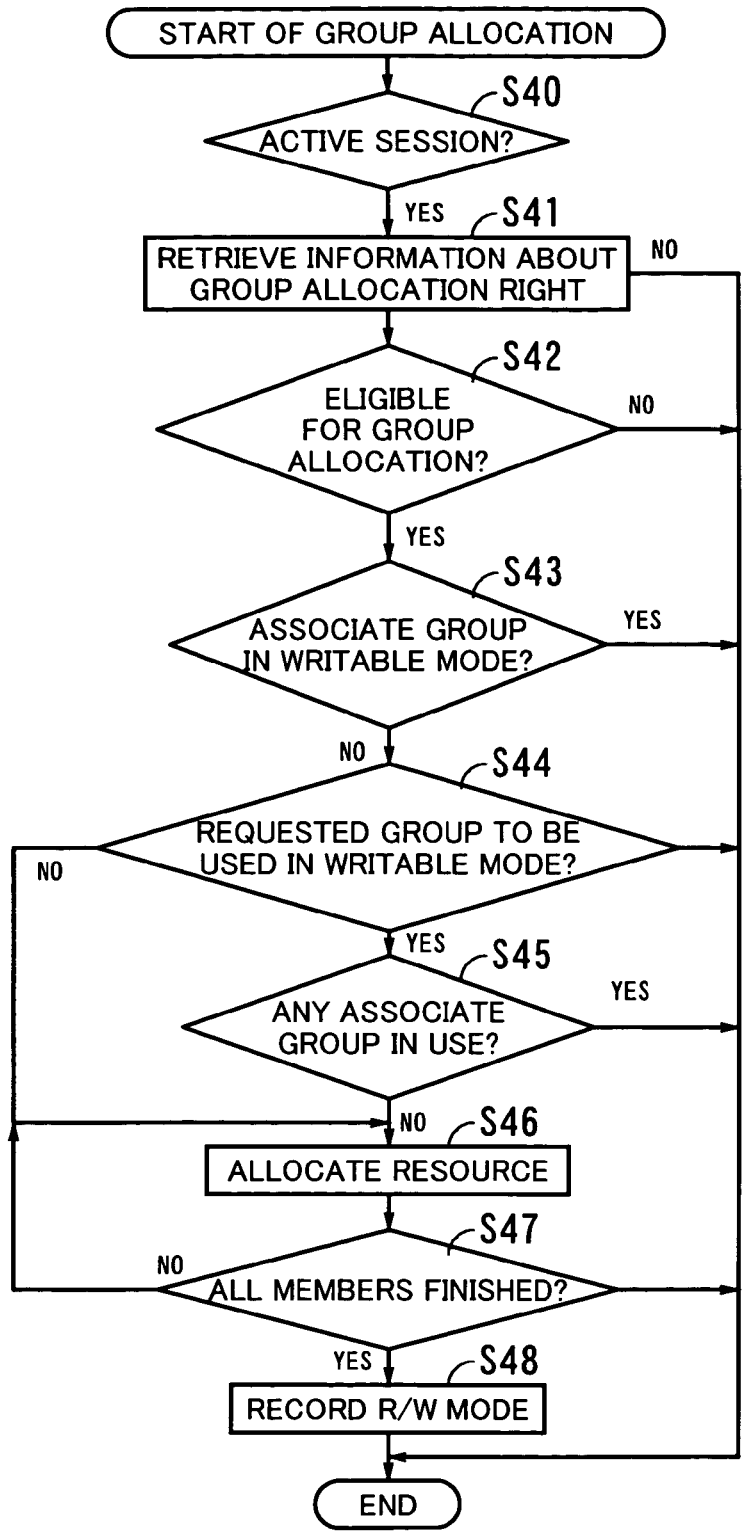
FIG. 10 is a flowchart which explains an example of a group-allocation process.

Referring next to FIG. 10, a process of allocating a resource group to a client will be described. This group allocation process comprises the following steps.

(S40) The CPU 10a determines whether the session specified in the client's request is valid and active. If so, the process advances to step S41. If not, the CPU 10a aborts the process, rejecting the client's request.

(S41) From the session management table of FIG. 6, the CPU 10a retrieves information about the group allocation right given to the requesting client.

(S42) The process advances to step S43 if the information retrieved at step S41 suggests that the client is eligible to be allocated a group. If not, the CPU 10a aborts the process, rejecting the client's request.

(S43) Scanning the group management table of FIG. 8, the CPU 10a identifies associate groups pertaining to the requested group. If any such associate group is found, the CPU 10a then determines whether it is being used in the writable mode, by consulting the session management table of FIG. 6. If so, the process is terminated, resulting in unsuccessful group allocation. Otherwise, the process advances to step S44.

(S44) The CPU 10a determines whether the requesting client intends to use the resource group in the writable mode. If so, the process advances to step S45. If not, it skips to step S46.

(S45) Consulting the session management table of FIG. 6, the CPU 10a determines whether any associated group is currently used, no matter which mode it is in. If such an active associate group is found, the process is terminated, resulting in unsuccessful group allocation. Otherwise, the process advances to step S46.

(S46) The CPU 10a extracts one;esource from those listed in the relevant group definition in the group management table of FIG. 8, and allocates it to the client.

(S47) The CPU 10a determines whether all the member resources have been allocated to the client. If there is any unfinished resource, the process returns to step S46 to repeat the same. Otherwise, the process advances to step S48.

(S48) Now that the client has obtained the intended group of resources, the CPU 10a updates the session management table of FIG. 6 with the group ID and its R/W mode information.

By executing the above steps, the data processing system 10 allocates a specific group of resources when a client requests it and updates the session management table to make a record of that group when the allocation is successfully finished. While the presence of an associate group would make the requested group temporarily unavailable, the system can be configured to suspend the request until the associate group is released.

Figure 11:
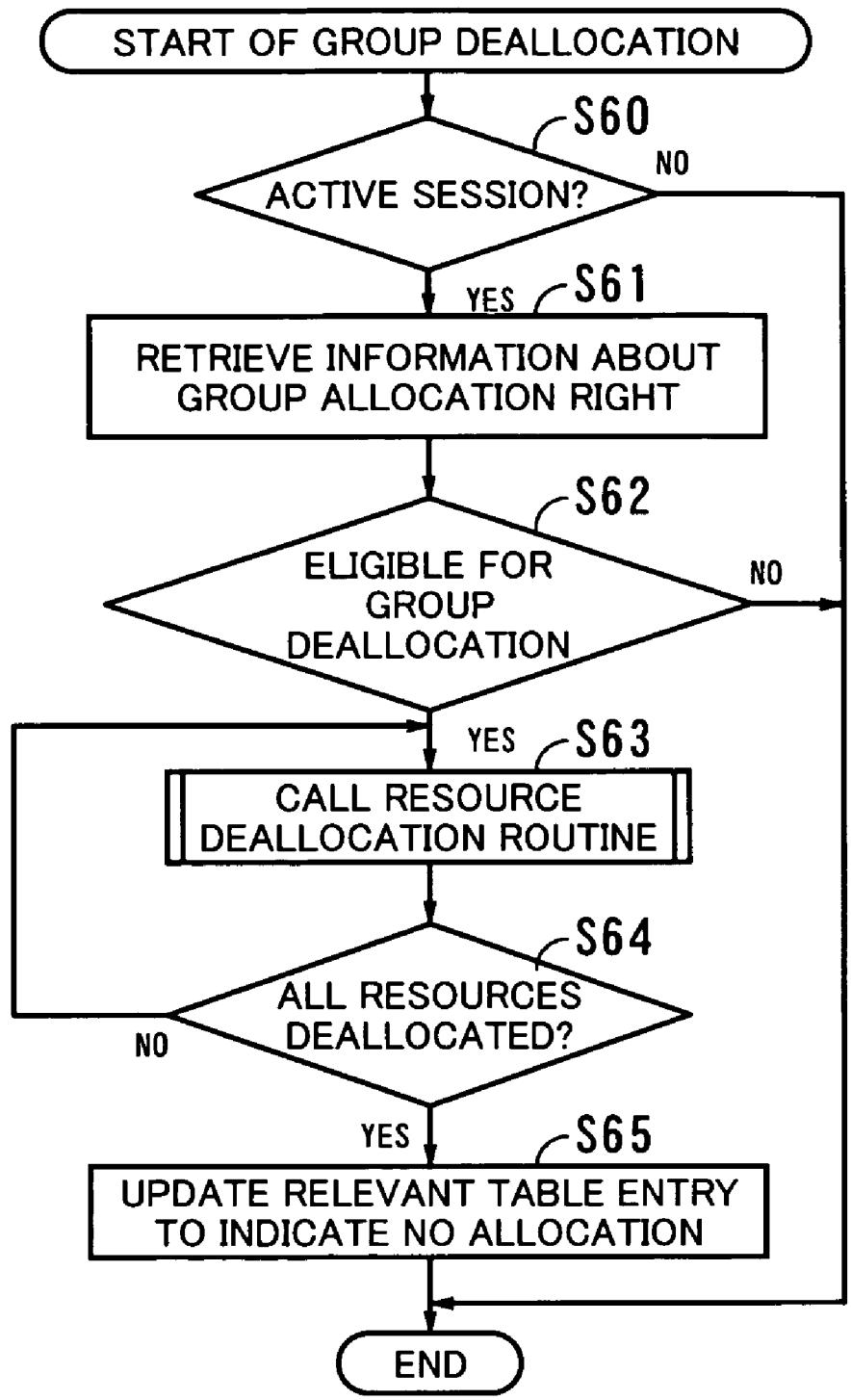
FIG. 11 is a flowchart which explains an example of an ungrouping process.

Referring next to FIG. 11, a process of deallocating a resource group from its client will be described. The process comprises the following steps.

(S60) The CPU 10a determines whether the session specified in the client's request is valid and active. If so, the process advances to step S61. If not, the CPU 10a aborts the process, rejecting the client's request.

(S61) From the session management table of FIG. 6, the CPU 10a retrieves information about the group deallocation right given to the requesting client.

(S62) The process advances to step S63 if the information retrieved at step S61 suggests that the client is eligible to deallocate a group from itself. If not, the CPU 10a aborts the process, rejecting the client's request.

(S63) The CPU 10a calls a routine to release a member resource of the requested group. The details of this resource deallocation routine will be presented in the next section with reference to FIG. 12.

(S64) The CPU 10a determines whether all the member resources have been deallocated from the client. If there is any unfinished resource, the process returns to step S63 to repeat the same. Otherwise, the process advances to step S65.

(S65) The CPU 10a updates the group management table of FIG. 8 to remove the record of the deallocated group. More specifically, it nullifies "Allocated group" field and "R/W" field of the relevant table entry.

Figure 12:
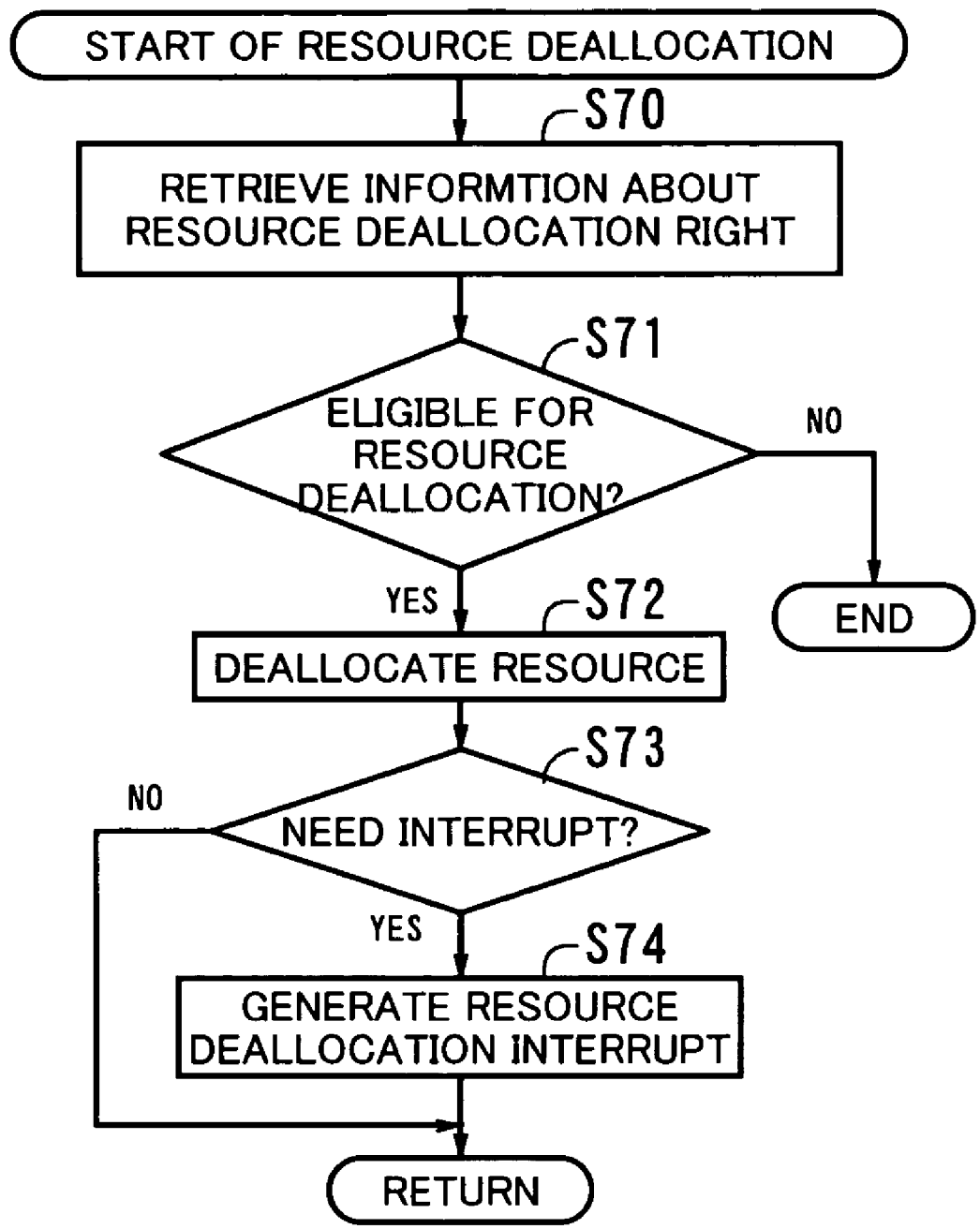
FIG. 12 is a flowchart which explains the details of "resource deallocation routine" shown in FIG. 11.

Referring next to FIG. 12, the resource deallocation routine called at step S63 will be described in detail. This routine comprises the following steps.

(S70) From the session management table of FIG. 6, the CPU 10a retrieves information about the resource deallocation right given to the requesting client.

(S71) If the information retrieved at step S70 suggests that the client is eligible to deallocate a resource, the process advances to step S72. If not, the CPU 10a aborts the process, rejecting the client's request.

(S72) The CPU 10a deallocates the resource of interest. This means that the resource becomes available to other clients.

(S73) If any client needs an interrupt that signifies the release of a resource, the process advances to step S74. If not, the control is transferred back to the calling process.

(S74) The CPU 10a initiates a resource deallocation interrupt to inform the waiting client(s) that the resource of interest has been released and is now ready to use. This interrupt is used in a resource deregistration process, which will be described later in FIG. 16.

Figure 13:
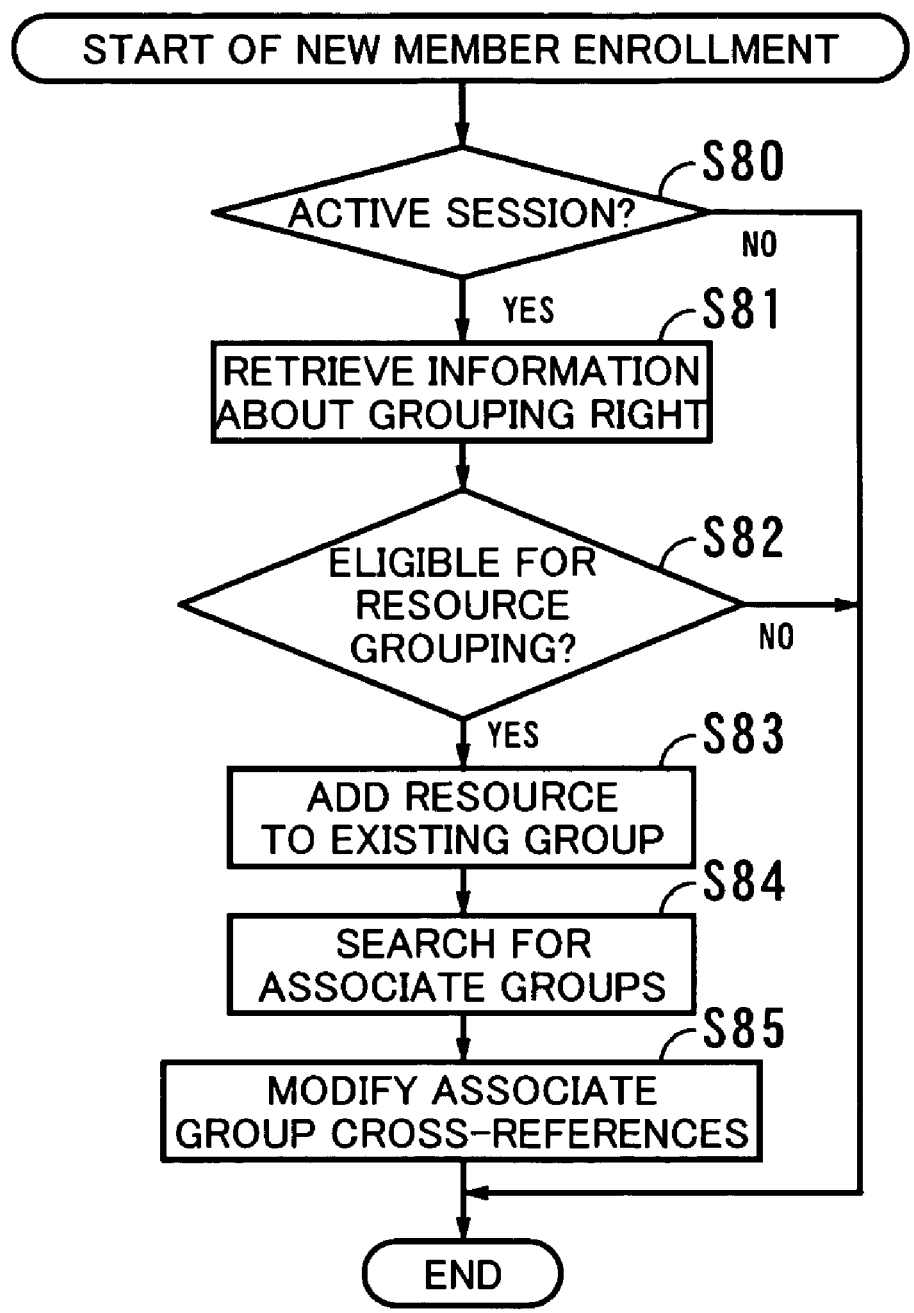
FIG. 13 is a flowchart which explains an example of a new member enrollment process.

The above section has discussed how a group is deallocated from a client. Referring next to FIG. 13, a process of adding a new member resource will be described. This process is initiated when, for example, the user wishes to manually enroll a certain resource as a new member of an existing group. The process comprises the following steps.

(S80) The CPU 10a determines whether the session specified in the client's request is valid and active. If so, the process advances to step S81. If not, the CPU 10a aborts the process, rejecting the client's request.

(S81) From the session management table of FIG. 6, the CPU 10a retrieves information about the grouping right given to the requesting client.

(S82) If the information retrieved at step S81 suggests that the client is eligible for resource grouping, the process advances to step S83. If not, the CPU 10a aborts the process.

(S83) The CPU 10a registers the resource to the specified group as its new member. More specifically, it updates the group management table of FIG. 8 with an additional resource ID.

(S84) The CPU 10a searches for the associate groups again. This is because the addition of a new member affects the scope of associate group membership, thus necessitating a search on the group management table.

(S85) The CPU 10a modifies the associate group cross-references. That is, the CPU 10a revises the relevant entry of the group management table by entering the additional associate groups identified at step S84, as well as updating the cross-references among the groups.

Figure 14:
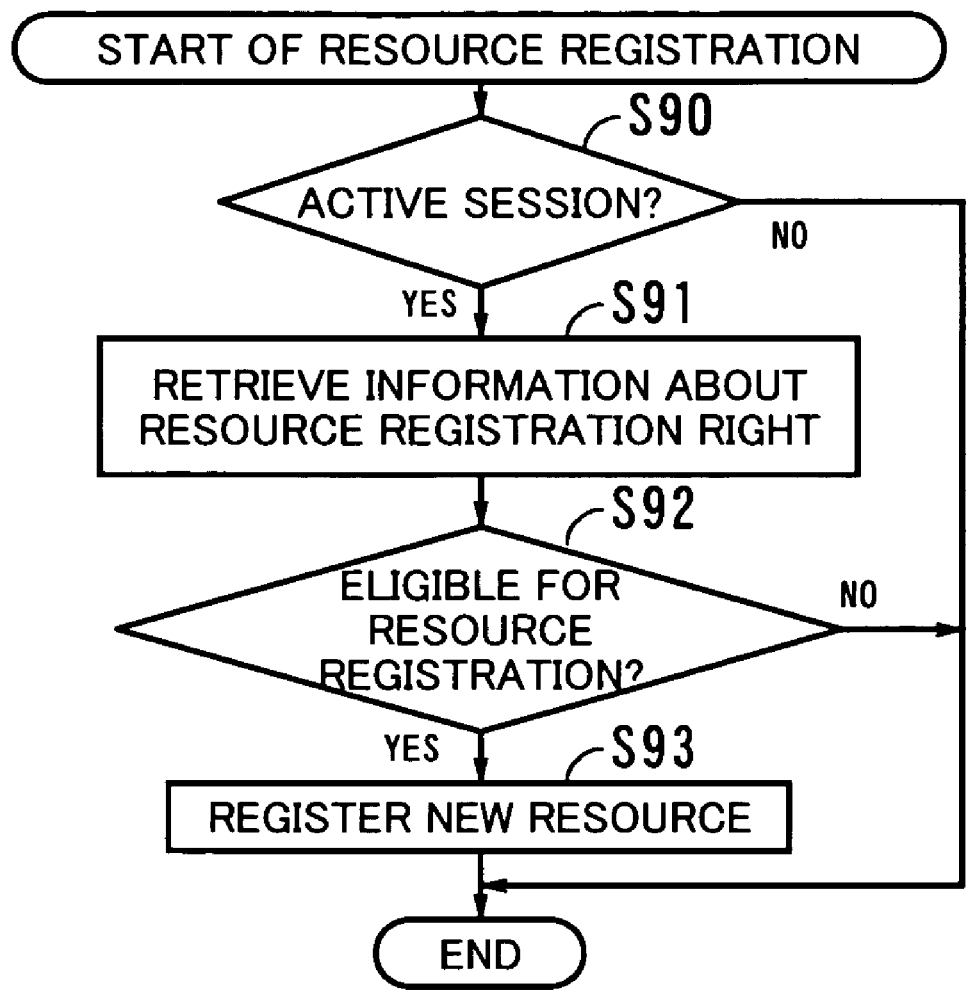
FIG. 14 is a flowchart which explains an example of a resource registration process.

The above-described process adds a new member resource to an existing group. Resources to be added in this process, however, have to be previously registered to the system. The flowchart of FIG. 14 illustrates a registration process for such a new resource. This process comprises the following steps.

(S90) The CPU 10a determines whether the session specified in the client's request is valid and active. If so, the process advances to step S91. If not, the CPU 10a aborts the process, rejecting the client's request.

(S91) From the session management table of FIG. 6, the CPU 10*a* retrieves information about the resource registration right given to the requesting client.

(S92) If the information retrieved at step S91 suggests that the client is eligible to register a new resource, the process advances to step S93. If not, the CPU 10*a* aborts the process.

(S93) The CPU 10*a* registers the specified resource to the system.

The above-described steps allows a client to register a new resource to the system. Resources registered in this way can now be added to an existing group if so desired.

Figure 15:
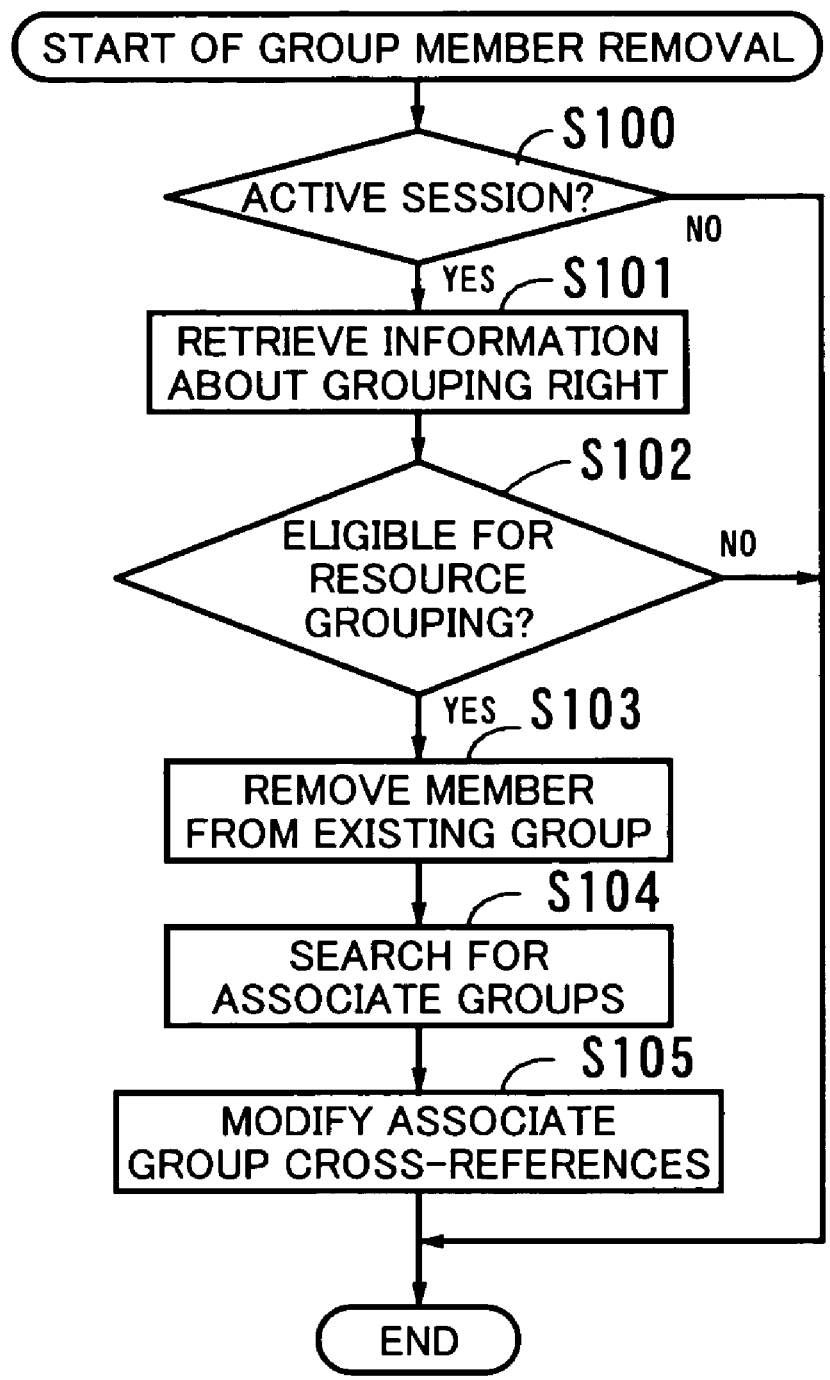
FIG. 15 is a flowchart which explains an example of a group member removal process.

Referring next to FIG. 15, a process of removing a member from an existing group will be described below. This process is initiated by, for example, a user who wishes to remove a specific resource from a certain existing group. The process comprises the following steps.

(S100) The CPU 10*a* determines whether the session specified in the client's request is valid and active. If so, the process advances to step S101. If not, the CPU 10*a* aborts the process, rejecting the client's request.

(S101) From the session management table of FIG. 6, the CPU 10*a* retrieves information about the grouping right given to the requesting client.

(S102) If the information retrieved at step S101 suggests that the client is eligible to modify a resource group, the process advances to step S103.

If not, the CPU 10*a* aborts the process.

(S103) The CPU 10*a* removes the specified member from the specified group. More specifically, it deletes a relevant resource ID recorded in the group management table of FIG. 8.

(S104) Now that the group has been changed, the CPU 10*a* makes a search again to find its associate groups according to the modified membership.

(S105) The CPU 10*a* updates the cross-reference information in the group management table of FIG. 8 with the new list of associate groups obtained at step S104. As a result of the change in its membership, the modified group may no longer be referred to as an associate group of some other groups. If this is the case, the identifier of the modified group has to be removed from the table entries of those other groups.

Figure 16:
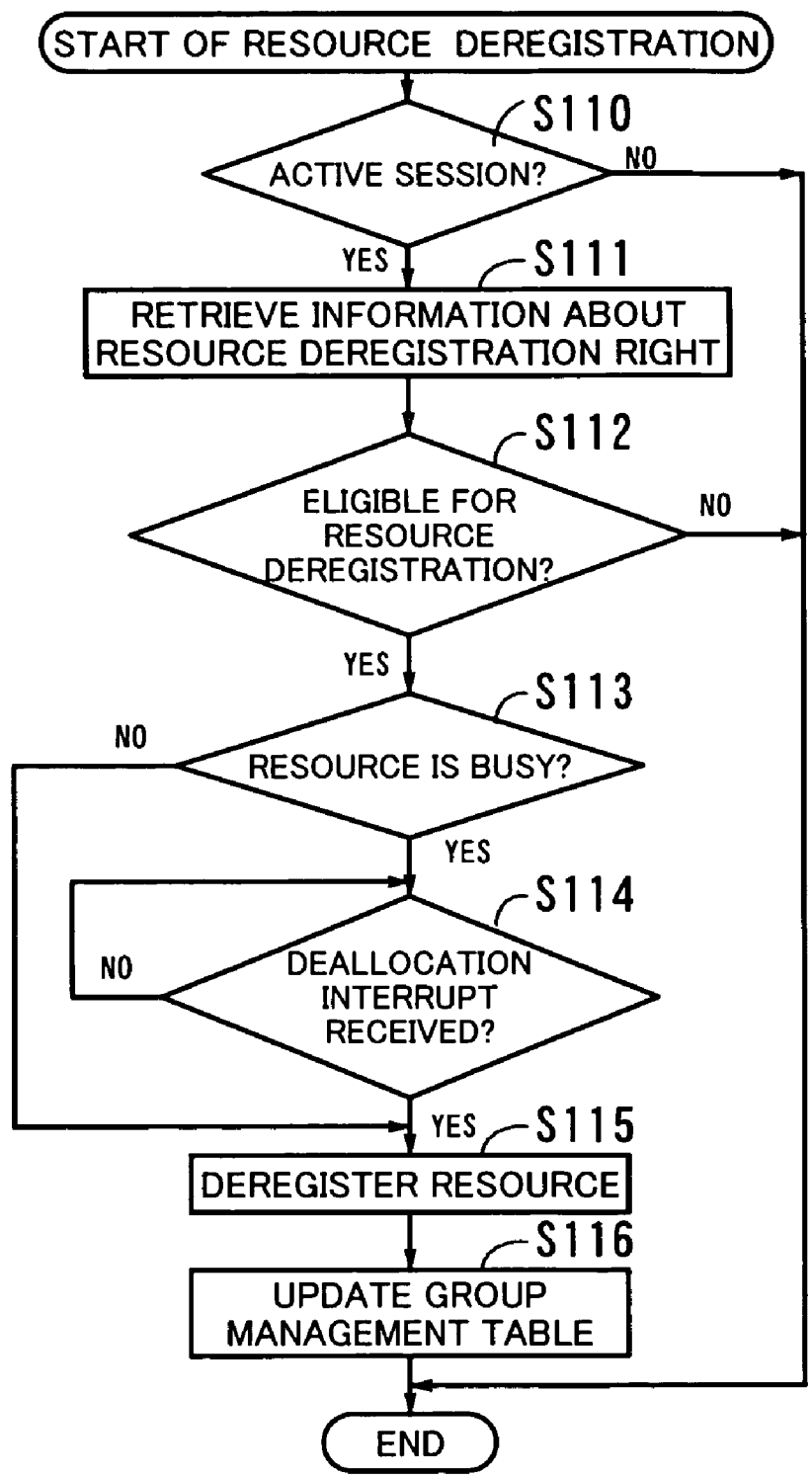
FIG. 16 is a flowchart which explains an example of a resource deregistration process.

The above-described process allows member resources to be removed from an existing group. Those resource may have to be further removed from the system. The flowchart of FIG. 16 illustrates a deregistration process for such obsolete resources. The process comprises the following steps.

(S110) The CPU 10*a* determines whether the session specified in the client's request is valid and active. If so, the process advances to step S111. If not, the CPU 10*a* aborts the process, rejecting the client's request.

(S111) From the session management table of FIG. 6, the CPU 10*a* retrieves information about the resource deregistration right given to the requesting client.

(S112) If the information retrieved at step S111 suggests that the client is authorized to deregister a resource, the process advances to step S113. If not, the CPU 10*a* aborts the process.

(S113) The CPU 10*a* determines whether the specified resource is in a busy state. If so, the process advances to step S114. If not, the process skips to step S115.

More specifically, the CPU 10*a* recognizes the resource as being busy until a resource deallocation interrupt is received. In addition to this, the CPU 10*a* may scan the group management table of FIG. 8 to see whether there is any group including the resource in question. The resource is considered to be busy when the session management table of FIG. 6 indicates that some other client is using that group.

(S114) The CPU 10*a* determines whether it has received a resource deallocation interrupt pertaining to the resource of interest. If so, the process advances to step S115, taking it as the signal of its transition to the non-busy state. If not, the process returns to step S114 to wait for an interrupt.

In the case where the feature of resource deallocation interrupt is disabled or unavailable, the CPU 10*a* monitors the session management table of FIG. 6 to see whether the group including the resource of interest is still being used. If that group ID is removed from the table, the CPU 10*a* understands that the resource has moved into the non-busy state.

(S115) The CPU 10*a* deregisters the specified resource from the system.

(S116) The CPU 10*a* updates the group management table accordingly.

Through the above-described processing steps, the client can remove an obsolete resource safely from the system, while observing the behavior of other clients.

The preferred embodiment of the invention has been described so far on the assumption of a distributed environment with multiple processing systems. It is, however, not intended to limit the invention to that specific environment. Rather, the present invention can also be applied to a single processor system, where each application acts as a client.

Although the group-based exclusive allocation has been described above, the present invention should not be limited to that particular form, but can also support the allocation on an individual resource basis. In that case, the proposed system examines each resource belonging to the requested group in the same way as shown in FIG. 10. The completion of group allocation is then signified when all the individual resources are allocated.

The processing mechanisms proposed above are actually implemented as software functions of a computer system. The processing steps of the proposed data processing system are encoded in a computer program, which will be stored in a computer-readable storage medium. The computer system executes this program to provide the intended functions of the present invention. Suitable computer-readable storage media include magnetic storage media and solid state memory devices. Other portable storage media, such as CD-ROMs and floppy disks, are particularly suitable for circulation purposes. Further, it will be possible to distribute programs through an appropriate server computer deployed on a network. The program file delivered to a user is normally installed in his/her computer's hard drive or other local mass storage devices, which will be executed after being loaded to the main memory.

The above discussion is summarized as follows. According to the present invention, a data processing system is provided to allocate necessary resources to requesting clients. In this system, a grouping unit defines groups of resources, and those groups are maintained by a group manager. When a request is received from a client demanding a specific group of resources, a detection unit finds such a member resource of the requested group that is currently used by any other client. If the detection unit has found a member resource in use, then a determination unit determines whether the detected member resource is to be modified. A permission unit permits the requesting client to make access to the requested group of resources if the detection unit finds that none of the member resources of the requested group are being used by any other client, or if the determination unit finds that neither the current user nor the requesting client intends to modify the detected member resource in use. This configuration of the proposed data processing system simplifies the process for a client to gain a plurality of computing resources.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data processing apparatus which allocates groups of resources to requesting clients, comprising:
   grouping means for defining groups of resources;
   group management means for managing the groups defined by said grouping means;
   detection means, responsive to a request from a client that demands a specific group of resources, for detecting whether the requested group includes a member resource currently used by any other client;
   determination means for determining, if said detection means has detected a member resource in use, whether the detected member resource is to be modified by any other client currently using the detected member resource; and
   permission means for permitting the requesting client to make access to the requested group of resources when said determination means finds that neither any other client currently using the detected member resource nor the requesting client intends to modify the detected member resource in use.

2. The data processing apparatus according to claim 1, further comprising allocation right memory means for storing information about whether each client has a right to be allocated a group,
   wherein said permission means examines the information stored in said allocation right memory means and rejects the request if the requesting client has no right to be allocated a group.

3. The data processing apparatus according to claim 1, further comprising grouping right memory means for storing information about whether each client has a right to define a new group,
   wherein said grouping means examines the information stored in said grouping right memory means and rejects the request if the requesting client has no right to define a new group.

4. The data processing apparatus according to claim 1, wherein said grouping of resources includes addition or removal of a member resource to/from an existing group.

5. The data processing apparatus according to claim 1, wherein said group management means further manages a valid period of each group and automatically removes such a group whose valid period has expired.

6. The data processing apparatus according to claim 1, wherein said detection means and determination means operate on a group-by-group basis.

7. A computer readable medium encoded with processing instructions for implementing a method which allocates groups of resources to requesting clients performed by a computer, the method comprising:
   defining groups of resources;
   managing the defined groups;
   detecting whether the requested group includes a member resource that is currently used by any other client responsive to a request from a client that demands a specific group of resources;
   determining if said detection means has detected a member resource in use, whether the detected member resource is to be modified by any other client currently using the detected member resource; and
   permitting the requesting client to make access to the requested group of resources when it is determined that neither any other client currently using the detected member resource nor the requesting client intends to modify the detected member resource in use.

8. A data processing apparatus which allocates groups of resources to requesting clients, the apparatus comprising:
   means for determining whether a member resource of a requested group of resources is currently in use by a client, and whether the member resource is to be modified by the client currently using the member resource; and
   means for permitting a requesting client to access the requested group of resources when neither the client currently using the member resource nor the requesting client intend to modify the member resource in use.

9. A computer readable medium encoded with processing instructions for implementing a method of allocating groups of resources to requesting clients performed by a computer, the method comprising:
   determining whether a member resource of a requested group of resources is currently in use by a client, and whether the member resource is to be modified by the client currently using the member resource; and
   permitting a requesting client to access the requested group of resources when neither the client currently using the member resource nor the requesting client intend to modify the member resource in use.

* * * * *